Dec. 12, 1967    J. L. MASSENGALE    3,357,197
PROCESS AND APPARATUS FOR PURGING REFRIGERATION SYSTEM
Filed June 3, 1966
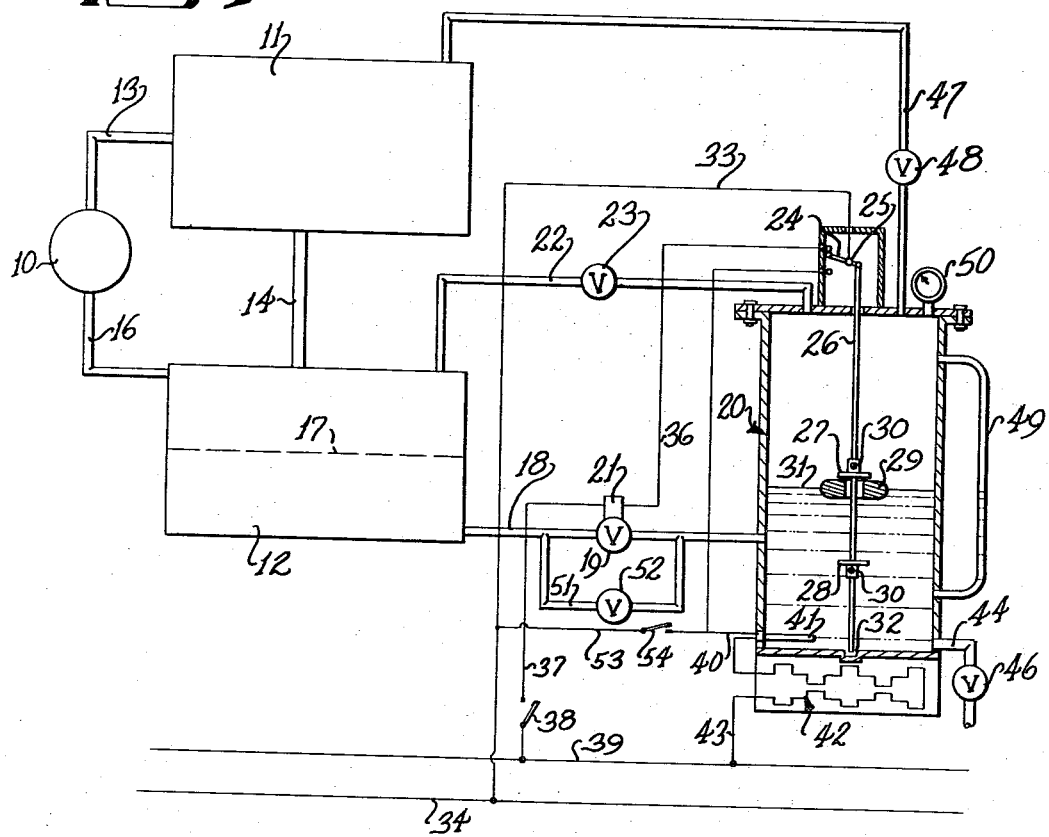
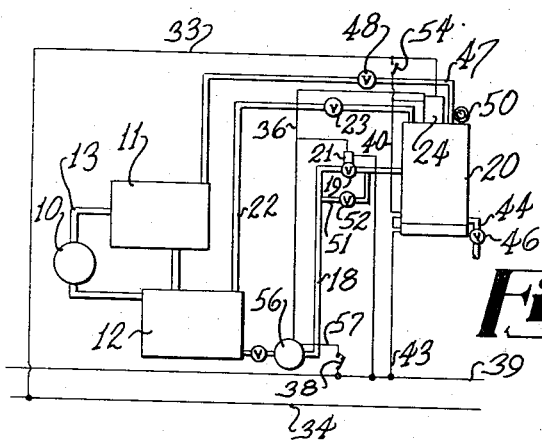
INVENTOR.
John L. Massengale
BY
Jennings, Carter & Thompson
Attorneys

United States Patent Office 3,357,197
Patented Dec. 12, 1967

3,357,197
PROCESS AND APPARATUS FOR PURGING
REFRIGERATION SYSTEM
John L. Massengale, 404 St. Charles Ave. SW.,
Birmingham, Ala. 35211
Filed June 3, 1966, Ser. No. 555,118
10 Claims. (Cl. 62—77)

ABSTRACT OF THE DISCLOSURE

Process and apparatus for purging refrigerating system of a polluting agent miscible with the refrigerant wherein successive quantities of the refrigerant liquid mixed with the polluting agent are introduced into a separator chamber. Volatile refrigerant is separated from the polluting agent in the successive quantities, and is returned to the refrigerating system, leaving the polluting agent in the bottom of the separator chamber for subsequent removal.

---

This invention relates to a process and apparatus for purging a closed refrigeration system and more particularly to such a process and apparatus for removing a polluting agent which is miscible with and has a higher boiling point than the volatile refrigerant employed in the system.

An object of my invention is to provide a process and apparatus for purging a closed refrigeration system of the character designated in which successive quantities of the liquid refrigerant mixed with the polluting agent are circulated through a separator chamber which separates the volatile refrigerant from the polluting agent.

Another object of my invention is to provide a process and apparatus for purging a closed refrigeration system which is automatic in operation to continuously separate the polluting agent, such as oil, water and other contaminants from the refrigerant.

A further object of my invention is to provide a process and apparatus for purging a closed refrigeration system of the character designated which includes means for periodically removing the polluting agent after a quantity thereof has collected in the bottom of a separator chamber.

A still further object of my invention is to provide apparatus for purging a closed refrigeration system of the character designated which shall be simple of construction and operation and which shall be particularly adapted for installation on conventional refrigerating systems such as centrifugal type refrigerating systems.

As is well known in the art to which my invention relates, refrigerant liquids which are miscible with polluting agents, such as oil, are very difficult to separate from the polluting agents, due to the fact that the materials cannot be separated by gravity. Such polluting agents reduce greatly the efficiency of operation of the refrigerating system since oil and other contaminants form an insulating film between the refrigerant and the conductive surface adjacent thereto to impede the transfer of heat therebetween and thus reduce the rate of evaporation of the refrigerant. It has been the usual practice to introduce air under pressure into the system to remove all of the mixture of oil and refrigerant liquid and then evaporate the refrigerant from the oil. The refrigerant vapor is then returned to the refrigerating system. This not only necessitates the complete removal of all of the liquid refrigerant mixed with the polluting agent but also introduces water into the system due to the presence of moisture in air. As is well known, water in a refrigeration system has a very deleterious effect on the working parts of the system.

To overcome the above mentioned time consuming and costly method of separating the refrigerant from polluting agents, I provide a separator unit which receives successive quantities of the refrigerant liquid mixed with the polluting agent. The volatile refrigerant is then separated from the polluting agent and is returned to the refrigerating system, thus leaving the polluting agent in the bottom of the separator chamber for subsequent removal therefrom. Improved means is provided for automatically transferring successive quantities of the mixture of refrigerant liquid and polluting agent to the separating unit.

Apparatus embodying features of my invention is illustrated in the accompanying drawing, forming a part of this application, in which:

FIG. 1 is a diagrammatic illustration of a conventional type refrigerating system showing my improved means for separating the polluting agent from the refrigerant incorporated therewith, parts being shown in section; and FIG. 2 is a diagramamtic view showing a modified form of my invention.

Referring now to the drawing for a better understanding of my invention, I show a portion of a conventional type refrigeration system embodying a compressor 10, a condenser 11 and an evaporator 12. The compressor 10 communicates with the condenser 11 by a conduit 13 and the condenser communicates with the evaporator 12 by a conduit 14. Connecting the evaporator 12 to the compressor is a conduit 16.

Communicating with the evaporator 12 below the liquid level therein, indicated at 17, is one end of a conduit 18. The other end of the conduit 18 communicates with a closed separator chamber 20. A control valve 19 is provided in the conduit 18 to control the flow of liquid refrigerant mixed with the polluting agent, such as oil, water or other contaminant, to the separator chamber 20. The valve 19 is shown as being actuated by an electrical solenoid 21. Communicating the upper portion of the separator chamber 20 with the upper portion of the evaporator 12 is a conduit 22 having a control valve 23 therein.

The separator chamber 20 carries a double throw switch element, indicated generally at 24, having a movable contact with is connected to and actuated by a vertical rod 26 extending downwardly in the separator chamber 20 as shown. Secured to the vertical rod 26 are vertically spaced collars 27 and 28 which are secured in selected positions by suitable means, such as set screws 30. Mounted for free sliding movement along the bar 26 is an annular float 29 which is adapted to engage the collar 27 when the liquid level, indicated at 31, rises to a predetermined level in the separator chamber 20. Also the float 29 is adapted to engage the collar 28 when the liquid level 31 drops to a predetermined elevation. Accordingly, upon engagement of the float 29 with the collar 27, the vertical rod 26 is raised a sufficient distance to actuate the double throw switch element 24 in one direction. On the other hand, upon engagement of the float 29 with the lower most collar 28, the vertical rod 26 is lowered due to the weight of the float to actuate the double throw switch 24 in the opposite direction. A recess 32 is provided in the bottom wall of the separator chamber 20 in position to receive the lower end of the vertical rod 26 whereby lateral movement of the vertical rod is limited.

The movable contact of the switch element 24 is pivotally supported at 25 and is connected by a line 33 to a power supply line 34. One stationary contact of the switch element 24 is connected by a line 36 to one side of the electrical solenoid 21 whereas the other side of the solenoid 21 is connected by a line 37 having a switch element 38 therein to a power supply line 39. The other stationary contact of the double throw switch 24 is connected by a line 40 in series with a thermostat 41 while the end of line 40 is connected to one side of a heating unit indicated generally at 42. The other side of the heating unit 42 is connected by a line 43 to power supply line 39.

It will thus be seen that with the movable contact of switch 24 in the position shown in FIG. 1 and with switch 38 closed, the circuit is completed to solenoid 21 to open valve 19 while the circuit to heater 42 is broken. As the liquid level rises float 29 engages a collar 27 and lifts rod 26 to move the movable contact of switch 24 downwardly, as viewed in FIG. 1, to complete the circuit to the heater 42 and break the circuit to solenoid 21 whereby valve 19 is closed.

A discharge conduit 44 is provided adjacent the lower end of the separator chamber 20 for removing the polluting agent, such as oil, water and the like, which is collected in the bottom of the separator chamber. A control valve 46 is provided in the conduit 44 whereby conduit 44 remains closed except for the removal of the polluting agent. To prevent the introduction of air into the separator chamber 20 as the polluting agent is removed through conduit 44, during the period that the system is in normal operation, a conduit 47 having a control valve 48 therein connects the upper portion of the separator chamber 20 to the condenser 11. The control valve 23 remains open and the control valve 48 remains closed except for the period of time that the polluting agent is removed through the discharge conduit 44. A sight glass 49 communicates the lower portion of the separator chamber 20 with the upper portion thereof, as shown, whereby the presence and level of the oil or other polluting agent in the separator chamber is indicated. Also, a compound gauge 50 is provided to indicate the pressure within chamber 20.

A by-pass conduit 51 communicates with the conduit 18 at opposite sides of the solenoid actuated valve 19 whereby refrigerant liquids and polluting agents mixed therewith are free to flow from the evaporator 12 to the separator chamber 20 during the season of the year that the refrigerating system operates, such as during the summer. On the other hand, during the winter, while the system is not in operation, the by-pass conduit 51 is closed by a control valve 52 and my improved apparatus described herein above controls the flow of liquid from the evaporator 12 to the separator chamber 20.

The polluting agent may also be removed from chamber 20, after volatiles have been removed therefrom, by energizing the heating unit 42 with all conduits to the chamber 20 being closed with the exception of discharge conduit 44. Current is then supplied to the heating unit 42 by a line 53 having a switch 54 therein. It will be understood that the switch 54 is open at all times with the exception of the time that the polluting agent is removed as just described.

From the foregoing description, the operation of my improved apparatus and the manner in which my improved process is carried out will be readily understood. Where the refrigerating system is not to be in operation over a period of time, such as during the winter, the valve 52 is closed whereby liquid refrigerant and the polluting agent mixed therewith can flow to the separator chamber 20 only through the solenoid actuated valve 19. Starting with valve 19 open, the switch 24 is in the position shown in FIG. 1 and the liquid refrigerant and polluting agent mixed therewith flows into the separator chamber 20 until the float 29 engages the collar 27 to actuate the switch 24 whereby its movable contact moves to a position to break the circuit through line 36 to deenergize solenoid 21 whereby the valve 19 is closed, thus restraining flow of liquid from the evaporator 12 to the separator chamber 20. In this position of switch 24 the circuit is completed through line 40 to the heating unit 42 whereby the heating unit is energized to volatilize the refrigerant whereupon it passes through conduit 22 to the evaporator 12. As the refrigerant liquid is evaporated, the liquid level 31 in the separator chamber 20 is lowered until the float 29 engages the collar 28 to move the rod 26 downwardly and return the switch 24 to the position shown in FIG. 1 to energize the solenoid 21 whereupon the valve 19 is opened. Also, the circuit to the heating unit 42 is deenergized at this time. The thermostat 41 maintains the temperature within the separator chamber 20 below a predetermined amount which is below the boiling point of the polluting agent to be purged from the system and slightly above the boiling point of the refrigerant. With valve 19 open, another quantity of refrigerant liquid mixed with the polluting agent is introduced into the separator chamber 20. Successive quantities of the refrigerant liquid and polluting agent are thus circulated through the separator chamber 20 whereupon the polluting agent is collected in the bottom of the separator chamber and the refrigerant vapor is returned by line 22 to the evaporator.

After a sufficient quantity of the polluting agent has collected in the separator chamber 20, indicated by the sight glass 49, switch 38 is opened thereby closing valve 19. The valve 23 is closed and valve 48 is opened to pressurize chamber 20 as indicated by gauge 50. Then valve 46 is opened until the polluting agent is removed. Valves 46 and 48 are then closed and valve 23 is opened and switch 38 is closed whereby the apparatus is ready for another cycle of operation. Also, as described above, the polluting agent may be removed after the volatiles have been removed from chamber 20 by closing all conduits to the separator 20 and then energizing the heating unit by closing switch 54 until chamber 20 is pressurized by sufficient refrigerant vapor to indicate a positive pressure on gauge 50. Then valve 46 is opened to drain the polluting agent.

During the summer, or while the apparatus is in substantially continuous operation, the valve 52 may be opened whereby the fluid by-passes the solenoid actuated valve 19 to flow into the separator chamber 20. During such periods of operation, the liquid refrigerant is of a temperature to boil itself with the refrigerant vapor passing through conduit 22 thus leaving polluting agents in the separator chamber 20.

In FIG. 2 I show a modified form of my invention which is adapted for use where the separator chamber is located at an elevation that does not permit gravity flow of the refrigerant and polluting agent from the evaporator 12 to the separator chamber 20. An electrically operated pump 56 is provided in the conduit 18 to force the liquid from evaporator 12 to the separator chamber 20. A line 57 connects the pump 56 in parallel with the solenoid 21 whereby the pump is energized each time the solenoid operated valve 19 is opened and is deenergized each time the valve 19 is closed.

From the foregoing, it will be seen that I have devised an improved process and apparatus for removing polluting agents from a refrigerating system. My improved process and apparatus is particularly adapted for removing oil, water and the like from refrigerant liquids that are miscible with oil, such as trichloromonofluoromethane sold under the trade name "Freon-11" and trichlorotrifluoromethane sold under the trade name "Freon-113." By providing means for introducing successive quantities of the refrigerant liquid and the polluting agent carried thereby into the separator chamber, together with means for separating and returning the refrigerant vapor to the refrigerating system, the polluting agents are collected in the bottom of the separator chamber. Also, by closing valve 23 and opening valve 48, which communicates the separator chamber 20 with the condenser 11 while the polluting agent is removed through valve 46 or by closing all conduits to chamber 20 except discharge conduit 44 after heat has been applied to pressurize chamber 20 to remove the polluting agent, no air enters the system.

While I have shown my invention in but two forms it will be obvious to those skilled in the art that it is not so limited, but is susceptible of various other changes and modifications without departing from the spirit thereof, and I desire, therefore, that only such limitations

What I claim is:

1. The process of purging a closed refrigeration system having a condenser and an evaporator and containing a volatile refrigerant mixed with a polluting agent miscible with and having a higher boiling point than said refrigerant, which comprises:
   (a) transferring said liquid refrigerant mixed with said polluting agent from the evaporator to a closed separator chamber,
   (b) controlling the flow of successive quantities of said refrigerant mixed with polluting agent to the separator chamber so that said flow is restrained after the liquid in the separator chamber rises to a predetermined level and said flow is commenced after the liquid in the separator chamber drops to a predetermined level,
   (c) heating said refrigerant mixed with polluting agent in the separator chamber after the liquid therein rises to said predetermined level to a temperature to volatilize said refrigerant and leave said polluting agent as a liquid so that the liquid in the separator chamber drops to said predetermined level to commence the transfer of another quantity of liquid refrigerant mixed with said polluting agent to the separator chamber,
   (d) transferring the volatilized refrigerant from the separator chamber to the evaporator, and
   (e) removing the polluting agent from the separator chamber after the volatilized refrigerant has been separated therefrom.

2. In apparatus for purging a closed refrigerating system having a condenser and an evaporator and containing a volatile refrigerant mixed with a polluting agent miscible with and having a higher boiling point than said refrigerant, means for purging the system of the polluting agent comprising:
   (a) a separator chamber,
   (b) a first conduit communicating the evaporator with said separator chamber to transfer liquid refrigerant mixed with said polluting agent from the evaporator to said separator chamber,
   (c) control means operable in response to a predetermined differential in liquid level in said separator chamber to restrain flow of liquid from the evaporator to said separator chamber after the liquid in said separator chamber rises to a predetermined level and to commence the flow of liquid from the evaporator to said separator chamber after the liquid in the separator chamber drops to a predetermined level whereby successive quantities of said liquid refrigerant mixed with said polluting agent are transferred to said separator chamber,
   (d) heating means operable to heat said refrigerant mixed with polluting agent in the separator chamber in response to the liquid in said separator chamber rising to said predetermined level to a temperature to volatilize said refrigerant and leave said polluting agent as a liquid so that the liquid in the separator chamber drops to said predetermined level to commence the transfer of another quantity of liquid refrigerant mixed with said polluting agent to the separator chamber,
   (e) a second conduit communicating said separator chamber with said evaporator to transfer volatile materials from said separator chamber to said evaporator, and
   (f) means to remove said polluting agent from said separator chamber.

3. In apparatus for purging a refrigerating system as defined in claim 2 in which a fluid pump is provided in said first conduit and is operatively connected to said control means to pump liquid to said separator chamber after the liquid in the separator chamber drops to said predetermined level and until the liquid in said separator chamber rises to said predetermined level.

4. In apparatus for purging a refrigerating system as defined in claim 2 in which said first conduit communicates with the evaporator a substantial distance below the liquid level in said evaporator and said predetermined level to which the liquid rises in said separator chamber is at an elevation above the point of communication between said first conduit and the evaporator so that the liquid in seeking its own level rises in said separator chamber to said predetermined level.

5. In apparatus for purging a refrigerating system as defined in claim 2 in which the control means operable in response to a predetermined differential in liquid level in said separator chamber comprises:
   (a) a switch element,
   (b) a liquid level sensing unit operatively connected to said switch element to operate said switch element in response to the liquid level in said separator chamber rising to and dropping to said predetermined levels,
   (c) a control valve in said first conduit, and
   (d) a valve actuator for said control valve operatively connected to said switch element to open said control valve when the liquid level in said separator chamber drops to said predetermined level and to close said control valve when the liquid level in said separator chamber rises to said predetermined level.

6. In apparatus for purging a refrigerating system as defined in claim 5 in which a fluid passageway by-passes said control valve and a flow control valve is provided in said passageway.

7. In apparatus for purging a refrigerating system as defined in claim 5 in which a heating element is operatively connected to said switch element and is energized and deenergized by said switch element in response to said liquid level in the separator chamber rising to said predetermined level and dropping to said predetermined level, respectively.

8. In apparatus for purging a refrigerting system as defined in claim 7 in which a thermostat is mounted to said separator chamber and is operatively connected to said heating element to deenergize said heating element upon a predetermined increase in temperature in said separator chamber.

9. In apparatus for purging a refrigerating system as defined in claim 2 in which a discharge passageway having a closure member therein is provided adjacent the lower end of said separator chamber for discharging the polluting agent.

10. In apparatus for purging a refrigerating system as defined in claim 9 in which a conduit having a control valve therein communicates said separator chamber with the compressor so that the polluting agent is removed without the introduction of air into the separator chamber.

References Cited

UNITED STATES PATENTS 3,013,404  12/1961  Endress et al. _____ 62—85 X
3,131,548   5/1964  Chubb et al. _____ 62—475 X LLOYD L. KING, *Primary Examiner.*